United States Patent [19]

Hauffe, deceased et al.

[11] Patent Number: 4,699,168

[45] Date of Patent: Oct. 13, 1987

[54] THEFT-RESISTANT VALVE

[75] Inventors: William L. Hauffe, deceased, late of Warrensburg, Ill., by Jean G. Hauffe, executrix; Joseph L. Daghe, Decatur, Ill.

[73] Assignee: Mueller Co., Decatur, Ill.

[21] Appl. No.: 911,062

[22] Filed: Sep. 24, 1986

[51] Int. Cl.$^4$ ............................................. F16K 35/00
[52] U.S. Cl. ..................................... 137/385; 70/176; 70/179
[58] Field of Search ................. 70/176, 178, 179, 181; 137/385

[56] References Cited

U.S. PATENT DOCUMENTS

| | | | |
|---|---|---|---|
| 703,564 | 7/1902 | Ellison | 70/179 |
| 1,325,189 | 12/1919 | Carter | 70/176 |
| 2,994,503 | 8/1961 | Smith | 70/176 |
| 3,560,130 | 2/1971 | Horhota | 137/385 |
| 3,722,853 | 3/1973 | Dargatz et al. | 137/385 |
| 4,483,366 | 11/1984 | Labita | 137/385 |
| 4,614,203 | 9/1986 | Russo | 137/385 |

FOREIGN PATENT DOCUMENTS 585811  2/1947  United Kingdom ................. 70/176

Primary Examiner—A. Michael Chambers
Attorney, Agent, or Firm—Cushman, Darby & Cushman

[57] ABSTRACT

A removable key operated locking device for a rotary valve includes a locking member having a tip having a selected diameter connected by a throat having a smaller diameter to a body portion which may have a slightly larger diameter than the tip portion and a predetermined length whereby the locking element is completely insertable within a specially designed receiving bore located at one end of the valve housing so as to be completely isolated from access from the exterior except by means of a plunger-type key; a locking cage is disposed within the receiving bore and is held in a predetermined locking position by cooperation with a conically-shaped annular surface formed on the surface of a portion of the locking bore; the locking cage cooperates with one end of cylinder portion of the key whereby, upon insertion of the cylindrical portion, the locking cage will be moved completely out of the path of travel of the tip portion of the locking element but will automatically engage under a spring force the neck portion of the locking element upon removal of the cylindrical portion of the key.

8 Claims, 8 Drawing Figures

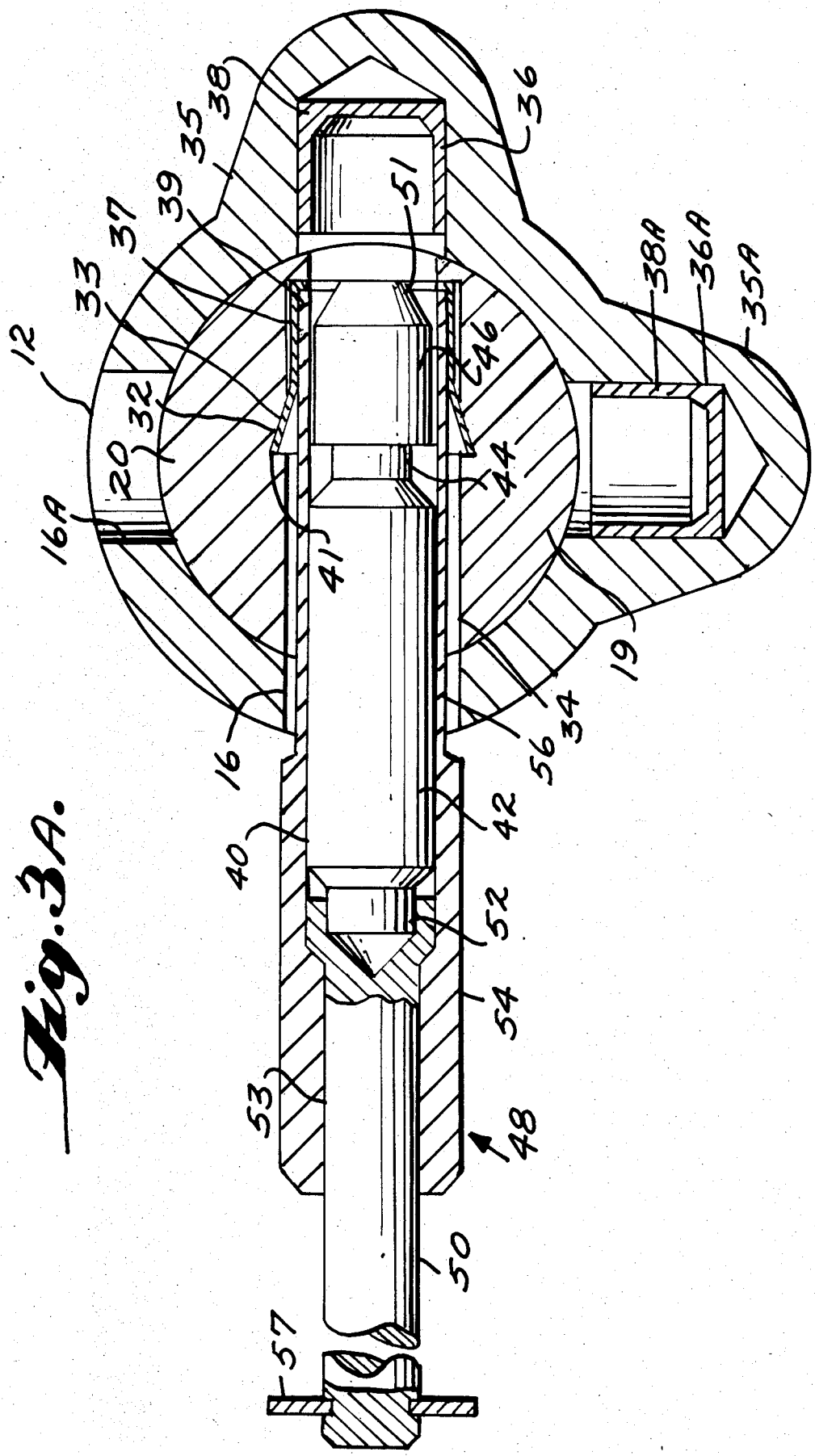

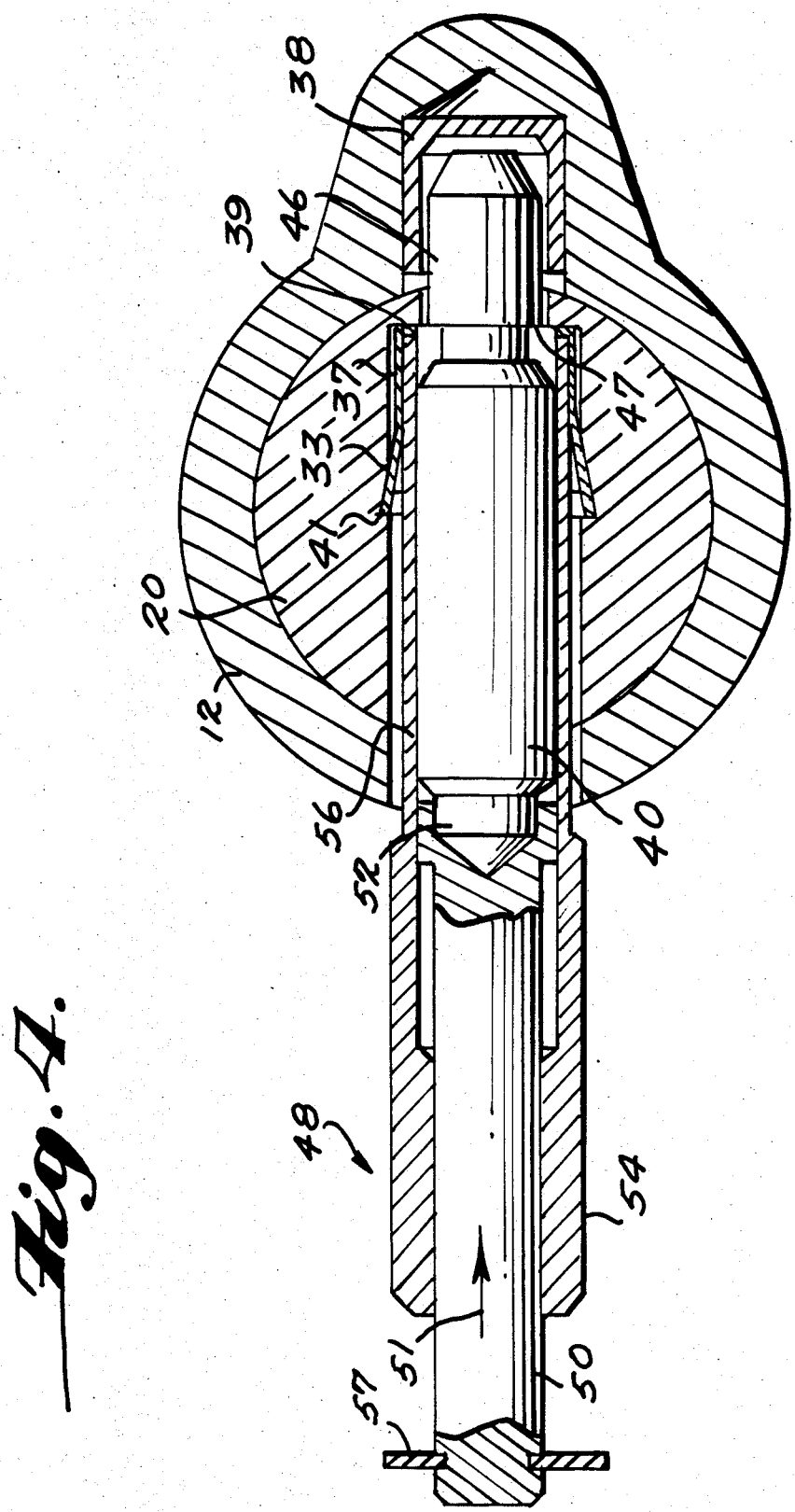

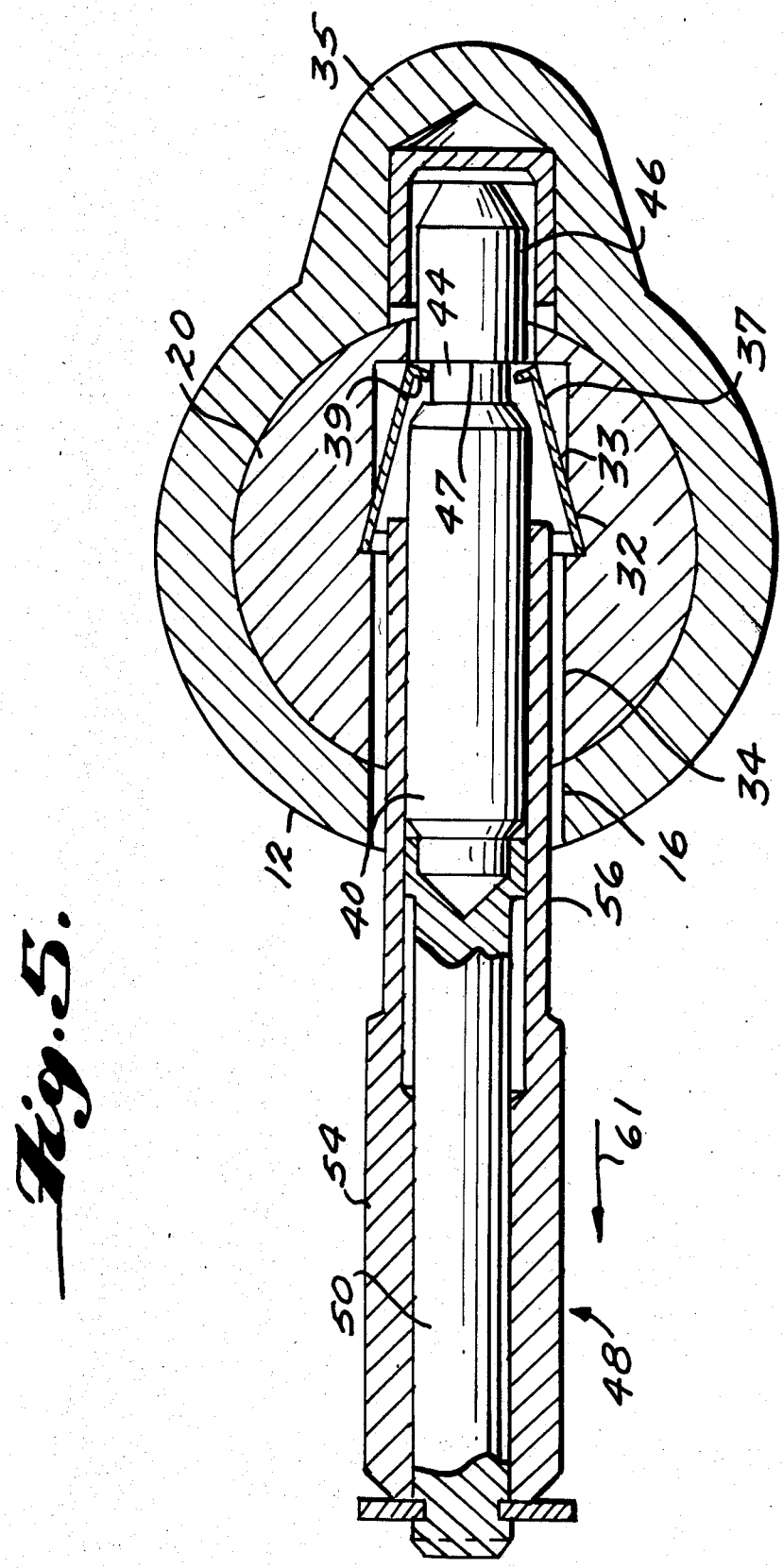

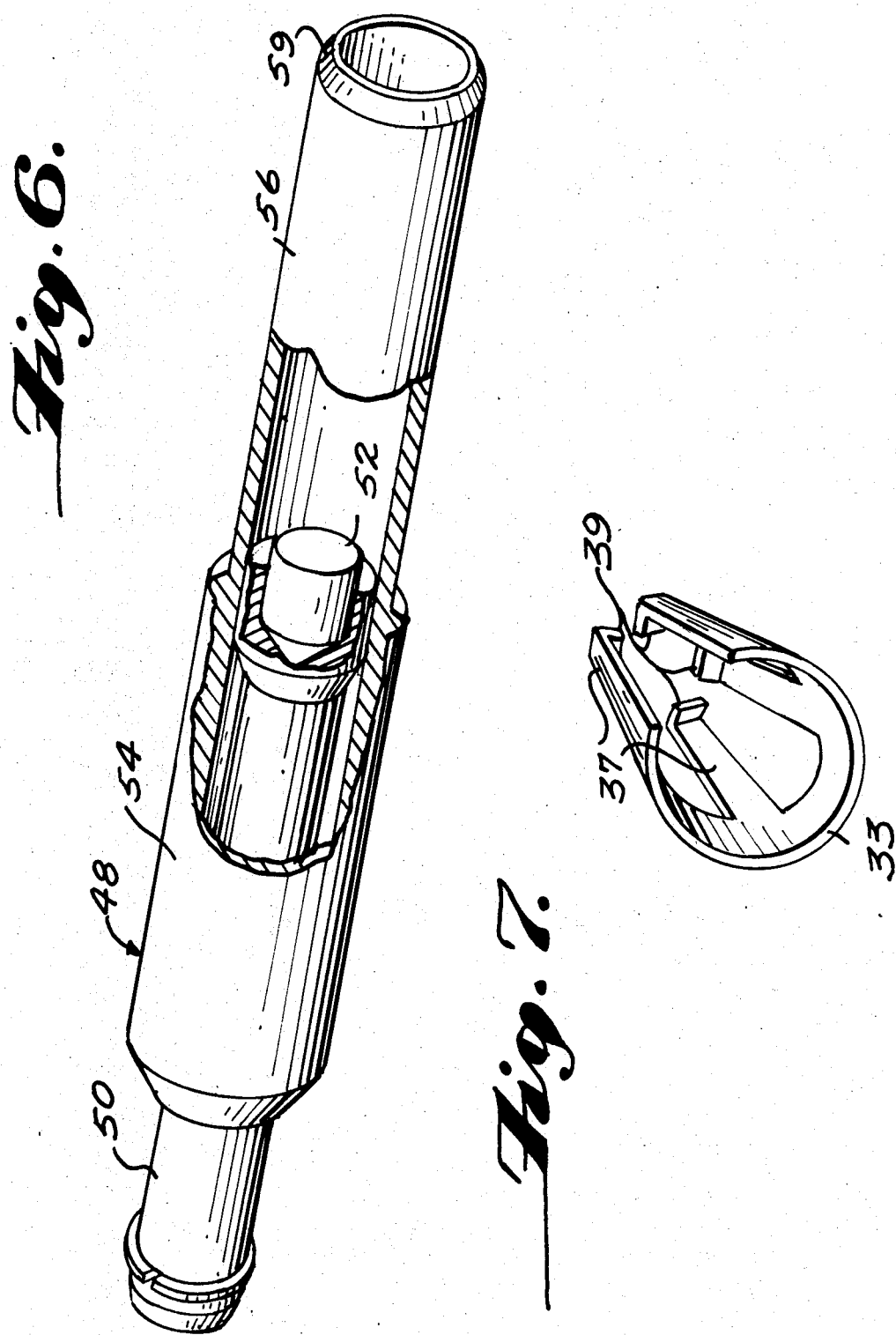

THEFT-RESISTANT VALVE

BACKGROUND AND SUMMARY OF THE INVENTION

The present invention relates to an improvement in rotary valves of the tamper-proof type, and more specifically, to a gas meter valve which may be locked in a selected position which is usually the closed position of the valve. In an alternate embodiment, the valve can be locked in either a closed or opened position, as desired, in such a manner that access to the locking element will be virtually impossible without destroying the valve itself.

In a number of circumstances, suppliers of natural gas or other fluids are required to secure the distribution lines to prevent unauthorized access thereto such as in the case where a gas line is being installed prior to occupancy by a resident or where accounts become delinquent or where a residence has been vacated and will remain unoccupied for a period of time. Quite often, prior to reinstitution of the gas service, it is necessary for a worker from the gas company to make certain that the gas consuming devices in a dwelling are properly operating before the gas service is reinstituted.

While the prior art has provided a variety of fluid distribution valve locking devices, with the presently increasing costs of maintaining and delivering natural gas to customers' it has become necessary to make certain that unauthorized or unmetered access to the gas lines is prevented not only to loss to the supplier, but also to prevent prevent economic accidental leakage which can result is catastrophic explosions.

In designing locking elements for such valves, it has become apparent that the locking element itself must be made of high-strength material such as stainless steel or the like which, obviously, will increase the expense of such elements particularly where they must be replaced in the event they are damaged as a result of attempts to defeat the locking feature. Conversely, it is desirable that the locking element itself be employed in such a manner in the valve so that the locking element can be reused a number of times with a plurality of different valves as circumstances may warrant. Thus, it is important that the elements of the locking device of the valve be operated in such a manner they do not deface or alter the surfaces of the locking element which would render reuse of the locking element at a subsequent time difficult or impossible as a result of such alteration of the surface or inter-engaging portions of the locking element. Where a locking device is provided that can insure the integrity of the locking element, manufacturers can resort to the use of stronger and thus more expensive metals in the construction of the locking element. This will have the advantage that a more secure locking device can be employed in the gas distribution system.

It is, accordingly, an object of the present invention to provide a rotary valve with a locking device of a type where repeated operation of the locking device will not alter the condition of the locking element itself yet one which will provide, at a reasonable cost, a secure, tamper-proof locking of a valve in a selected position.

The locking device of the present invention will provide a secure locking of a valve element where the locking element itself will be isolated from tampering from the outside of the valve by tools that are commonly available as well as a tamperproof valve that will be substantially immune from breaking of the locking device without destroying the valve itself.

A still further object of the present invention is to provide a locking element for a tamperproof valve which can be easily operated a number of times over a period of years with a plunger-type key element which will insure that the locking bore of the valve without defacing or marring the surface of the locking element which would render subsequent use difficult or impossible.

To accomplish the foregoing objects, the rotary valve of the present invention is provided with a body member having a passage which is intersected by a plug seat. A ported valve plug member is rotatably mounted relative to the plug seat to be movable between open and closed positions, the valve plug having an end portion which terminates flush with or below the exterior of the valve member. One end of the plug member extends exteriorly of the housing and, as is conventional, is provided with an operating head to facilitate rotation of the plug such as by the application of a tool to the head. Between the operating head and the port of the valve body, a locking bore is provided and which extends through this portion of the valve body. The locking bore is provided with a first cylindrical portion of a selected diameter for receiving the body of a locking element, a second partially cylindrical portion which, according to the present invention, is also provided with a frustoconical surface which cooperates with a locking cage, described below. Adjacent the conical surface another cylindrical bore section is provided through which is inserted the cylindrical tip portion of the locking element. The cylindrical tip portion of the locking element is connected to the body portion by a reduced diameter neck portion which cooperates with the fingers of the locking cage to securely retain the locking element in its locked position. In this position, the tip portion of the locking element extends completely through its associated bore into a reinforced steel plug member which is located in a bore provided in the housing of the valve housing itself. A plunger-type key element is provided with a cylindrical end which is insertable into the locking bore surrounding the body of the locking element to engage and push back the fingers of the locking cage completely out of the path of travel of the tip portion of the locking element. The key element may be provided with a magnet in the handle thereof to enable it to retain the locking element to facilitate withdrawal of the locking element when it is desired to unlock the valve. The cylindrical portion of the key element is movable independently of the handle portion thereof. With this arrangement, insertion of the locking element into the locking bore will be easily effected by inserting the cylindrical portion of the key to cause the fingers of the cage to be resiliently pushed out of the path of travel of the locking element. Thereafter, the plunger and the cylindrical portion of the key can be withdrawn as the locking element will be retained in the locking bore by the fingers of the cage.

With this arrangement, alteration or defacing of any of the surfaces of the locking element will be substantially prevented thus ensuring smooth operation of the locking element over a number of uses and with a number of similarly fashioned locking devices of other rotary valves.

The foregoing and other advantages of the present invention will become apparent as consideration is given to the following detailed description taken in conjunction with the accompanying drawings, in which:

BRIEF DESCRIPTION OF THE DRAWINGS

FIG. 3A is a sectional view similar to FIG. 3 but showing an alternate embodiment of the rotary valve of the present invention;

FIG. 4 is a view similar to FIG. 3 but showing the locking element fully inserted into the locking bore;

FIG. 5 is a view similar to FIG. 3 but showing the withdrawal of the cylindrical portion of the locking plunger;

FIG. 6 is a perspective view of the key plunger of the present invention; and

FIG. 7 is a perspective view of the spring locking cage utilized in the present invention.

DETAILED DESCRIPTION OF THE INVENTION

Figure 1:
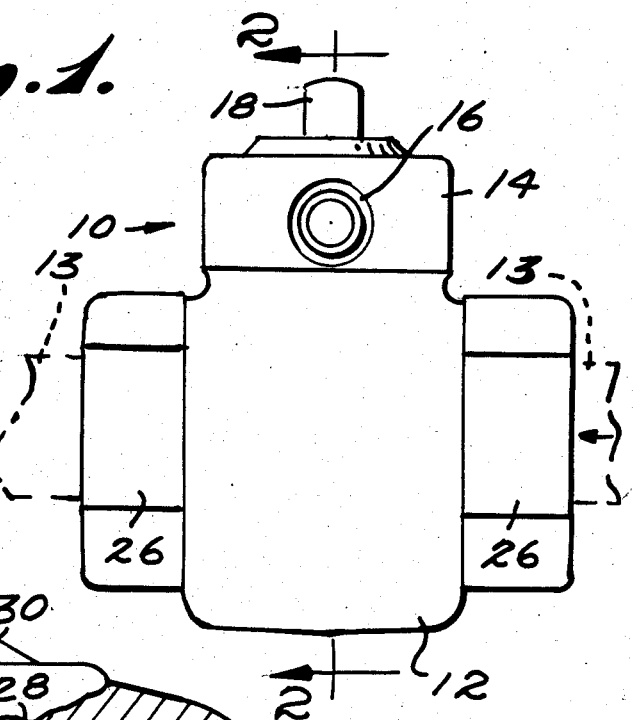
FIG. 1 is an elevational view of the rotary valve of the present invention.

Referring now to the drawings wherein like numerals designate corresponding parts throughout the several views, there is shown in FIG. 1 an elevational view of a rotary valve 10 incorporating the tamperproof features of the present invention. In the valve 10, there is provided a housing 12 from the upper end of which the operating head 18 of a plug member 20 extends.

The upper portion 14 of the housing 12 incorporates the tamperproof locking element bore 16. As is conventional, fittings 26 on opposite sides of the housing 12 are provided for receiving conduits 13 in a fluid tight manner as is well known. While the basic valve structure of the present invention illustrates a cylindrical type plug, as described below, it will be understood that tapered or other types of plugs including ball valves may be employed. In this regard, the disclosure of U.S. Pat. No. 3,554,213, which is incorporated herein by reference, may be referred to for a similar type of valve body in which the locking feature of the present invention may be usefully employed.

Figure 2:
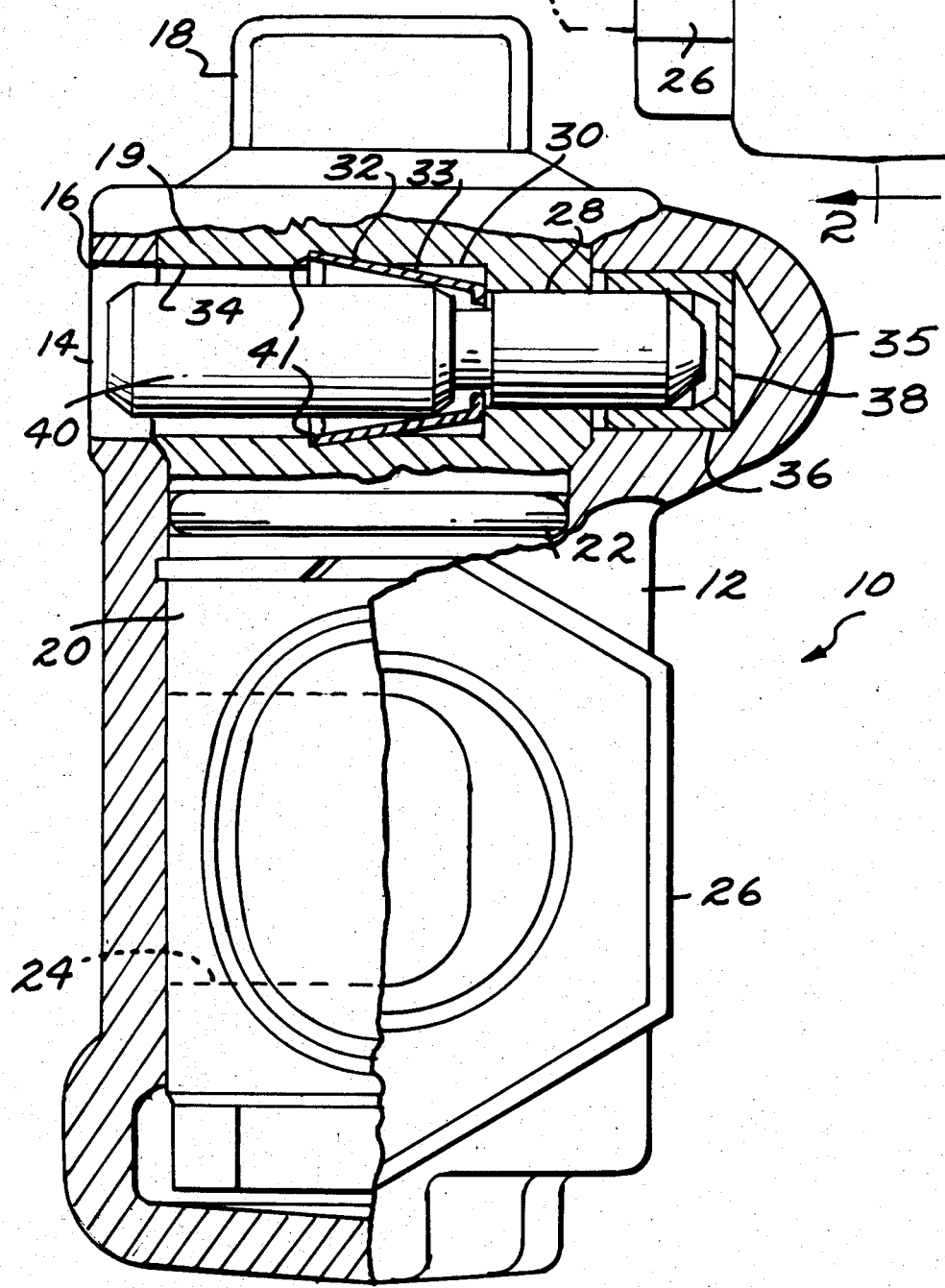
FIG. 2 is a view along lines 2—2 of FIG. 1.

Referring now to FIG. 2, the cylindrical plug 20 will be seen disposed within the housing 12 so as to be rotatable about a longitudinal axis thereof to bring the passage 24 into and out of alignment with the fitting portions 26 in which the conduits 13 are connected in a fluid tight manner, as is conventional in this art.

The upper portion of the plug 20 may be provided with a groove in which is located the conventional O-ring seal 22.

The upper portion 19 of the plug 20 is provided with a first cylindrical bore 28 adjacent to which is an enlarged diameter bore 30 one end of which is frustoconically shaped as at 32 and which is provided with a land 41 to serve as a seat for one end of a cage 33. Adjacent the land 41 another cylindrical bore portion 34 is provided in the upper portion 19 of the plug 20 and which is alignable with a bore 16 which passes through the wall of the housing 12 on one side thereof.

The upper portion of the housing 12 is provided with an enlarged portion 35 the interior of which is formed with a substantially cylindrical bore 36 in which is located a plug 38 which is preferably of reinforced hard metal such as hardened steel to resist cutting such as by a hacksaw or similar device.

The locking element 40 of the present invention is shown in its locked position in FIG. 2.

Figure 3:
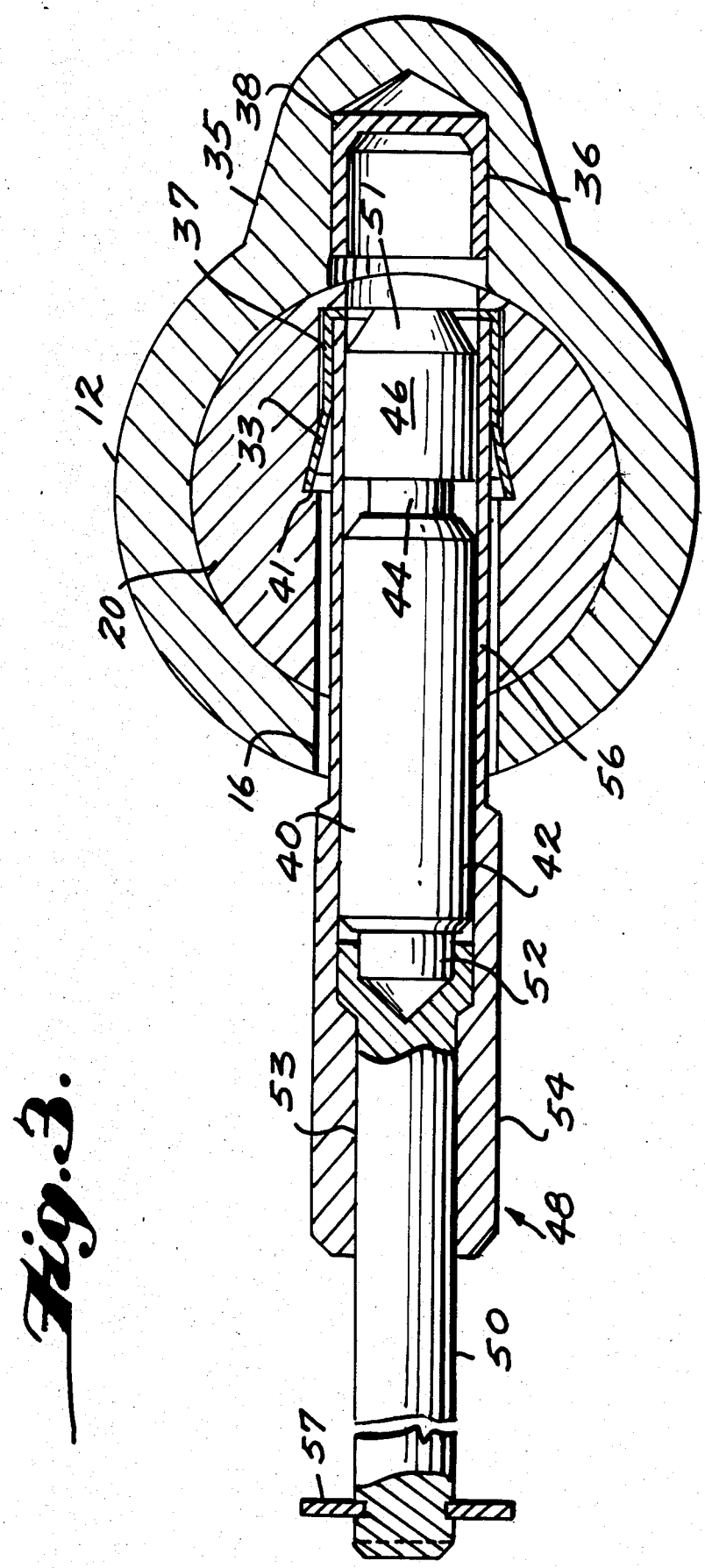
FIG. 3 is a sectional view from above showing the insertion of the plunger-type locking key cooperating with the locking element of the present invention.

With reference now to FIG. 3, the locking element 40 of the present invention will be described as it cooperates with the plunger key element 48 of the present invention. The locking element 40 includes a cylindrical body portion 42 which at its forward end portion tapers to a reduced diameter neck 44 which is connected to the cylindrical tip portion 46 which is provided with a tapering end 51. The tip 46 is cylindrical in shape and has an exterior diameter such that it will closely interfit with the interior of the plug 38 so as to be snugly insertable therein. The plunger key element 48 includes a body 54 which at one end is provided with a hollow cylindrical portion 56 in which the body 42 of the locking element 40 is smoothly slidable. The exterior diameter of the tip 46 should preferably be slightly smaller than that of the body 42 to facilitate moving the locking element 40 into its locking position and also to render duplication more difficult. Also, at least the body portion 42 of the locking element 40 should be made of magnetizable metal to cooperate with a magnet 52 which is mounted at the adjacent end of the plunger element 50 of the key 48. The plunger 50 is slidable through a bore 53 formed in one end of the cylindrical portion 54 of the key element 48. A stop ring 57 may be mounted on the free end of the plunger 50, as illustrated.

Referring to FIG. 3A, there is shown an alternate embodiment where the housing 12 is provided with a second bore 16a opposite another enlarged portion 35a which corresponds in proportion to enlarged portion 35. A cylindrical bore 36a is provided on the interior of the enlarged portion 35a just as with the embodiment of FIG. 3. These corresponding elements are provided with the suffix "A" and will be appreciated that the embodiment of FIG. 3A provides a valve theft resistant locking arrangement where the valve body 20 can be locked in one of two positions, either opened or closed.

As shown in FIG. 3, the plunger 50 is in its fully retracted position, that is, moved fully to the left as viewed in FIG. 3 relative to the cylindrical portion 54 of the key element 48 whereby the locating element 40 is substantially fully withdrawn within the cylindrical end portion 56 of the key element and held in that position by the magnet 52. To effect locking of the plug 20 in the illustrated position, the cylindrical portion 54 is inserted into the bore 16 of the housing 12 and then fully into the annular space between the interior of the bore 34 of the upper portion 19 of the plug 20 and the exterior of the body 42 of the locking element until the end of the cylindrical portion 56 engages and deflects the fingers 37 of the cage 33 outwardly so that the bent ends 39 of the fingers 37 are moved fully out of the path of travel of the tip 46 of the locking element 40 as illustrated in FIG. 3. By virtue of the provision of the conical surface 32, a strong return biasing force is provided to constantly urge the fingers 37 to return to their unstressed position as illustrated in FIG. 2.

With reference now to FIG. 4, full insertion of the locking element 40 is effected by moving the plunger 50 in the direction of the arrow 51 which will result in full insertion of the tip 46 into the plug 38 while the fingers 37 and their bent ends 39 are maintained fully out of the path of travel of the tip 46.

Thereafter, the operator will hold the plunger 50 against movement while withdrawing the cylindrical portion 54 rearwardly as illustrated in FIG. 5 in the direction of the arrow 61. This will result in release of the fingers 37 so that they will return to their unstressed position as illustrated in FIG. 5 where the bent portions 39 of the fingers 37 will engage the neck 44. Thereafter, the worker will simply withdraw the key element 48 while the ends 39 of the fingers 37 will engage the edge 47 of the tip 46 to retain the locking element 40 in its locked position as illustrated in FIG. 5. To effect removal of the locking element 40, the key 48 is disposed in the position illustrated in FIG. 4 whereupon the operator will withdraw the plunger 50 from the cylindrical portion 54 after the magnet 52 has engaged the cylindrical body 42 of the locking element 40. With the end 56 of the cylindrical portion fully inserted, the fingers 37 and their respective bent ends 39 will be held in a fully retracted position out of the path of travel of the tip 46 of the locking element 40.

With reference now to FIG. 6, a perspective of the plunger key element 48 view with parts broken away for clarity is shown. In this embodiment, the cylindrical portion 56 may be provided with a beveled end 59 to facilitate insertion of this portion into the bores and as well as engagement with the fingers 37 of the cage 33.

The cage 33 is illustrated in more detail in FIG. 7. As shown, the key 33 may be generally ring shaped but is provided with a gap to facilitate insertion of the cage down the bore 16 of the housing and the bore 34 of the plug 20. For this purpose, the cage 33 may be made of spring metal so that, to effect insertion, the cage 33 will be compressed to facilitate insertion thereof. As the cage end passes the circular edge 41, it will expand so that the outer surfaces of the fingers 37 will engage the conical surface 32 of the bore 30. With arrangement, removal of the cage 33 will be substantially prevented.

Having described the invention, it will be apparent that modifications may be made thereto without departing from the spirit and scope of this invention as defined in the appended claims.

What is claimed is:

1. In combination, a tamperproof rotary valve capable of being locked in a selected position, said rotary valve comprising a body member having a valve seat therein and provided with a flow passageway therethrough intercepted by said valve seat, a rotatable valve member having a flow passageway therethrough, said valve member being rotatable about an axis in said body member between a first position where said flow passageways are in registration wherein flow through said rotary valve is permitted and a second position where said flow passageways are completely out of registration wherein flow through said rotary valve is prevented, said valve body member having a locking portion located on one side of said flow passageway of said body member, said locking portion including a closed bottom bore on one side of said body member and an opening in alignment with said closed bottom bore disposed on the opposite side of said body member, said valve member having an end portion extending into said locking portion with said end portion including operating means extending therefrom and terminating exteriorly of said body member, said end portion of said valve member having bore means therethrough movable with said valve member so as to alignable with said opening and said closed bottom bore including a longitudinal axis and a first bore having a first diameter adjacent one end thereof and a second bore having a second diameter which is greater than said first diameter adjacent the other end thereof, said bore means including seat means intermediate said first and second bores for locating resilient clip means, said clip means having a first end seated in said seat means and a second end having a plurality of resiliently flexible fingers movable between a retracted position away from said longitudinal axis and toward said axis to a locking position, said second end of said clip means being disposed adjacent to said first bore with said first end of said clip means being remote from said first bore, a locking element having a tip having a diameter to permit snug insertion of said tip into said closed bottom bore and said first bore, a neck portion extending from said tip and having a diameter reduced relative to the diameter of said tip and a body extending from said neck and having a diameter greater than that of said neck but less than the diameter of said second bore of said bore means such that when said locking element is fully inserted into said bore means, an annular space is defined between said second bore and said body of said locking element to permit the reception of key means, said tip and said neck having relative lengths such that, when said tip is inserted into said closed bottom bore, said neck will be disposed adjacent to said fingers of said clip means so that retraction of said locking element will be prevented by abutment of said fingers against said tip when said fingers are in said locking position.

2. The combination as claimed in claim 1 wherein key means are provided, said key means including a hollow cylindrical portion having an internal diameter to permit said body of said locking element to be received therein and an external diameter to permit said hollow cylindrical portion to be inserted into said annular space and engage said fingers of said clip means to move said fingers from said locking position generally radially outwardly completely out of the path of travel of said locking element upon insertion thereof in said bore means to said retracted position.

3. The combination as claimed in claim 1 wherein said valve body is made from a material having a selected hardness and said closed bottom bore includes a lining member having a hardness substantially greater than said selected hardness.

4. The combination as claimed in claim 2 wherein said key means includes plunger means movably carried by said hollow cylindrical portion for releasably engaging said locking element.

5. The combination as claimed in claim 4 wherein said plunger means includes a magnet and said body of said locking element includes magnetic material.

6. The combination as claimed in claim 1 wherein said seat means includes a frustoconical surface portion and said first end of said clip means includes a conical surface portion shaped to complementarily engage said frustoconical surface portion.

7. The combination as claimed in claim 1 wherein said valve body member includes another locking portion located on said body member and spaced from a locking portion a selected number of degrees whereby said valve member can be locked in either one of two positions.

8. In combination, a tamperproof rotary valve capable of being locked in a selected position, said rotary valve comprising a body member having a valve seat therein and provided with a flow passageway therethrough intercepted by said valve seat, a rotatable valve member having a flow passageway therethrough, said valve member being rotatable about an axis in said body member between a first position where said flow passageways are in registration wherein flow through said rotary valve is permitted and a second position where said flow passageways are completely out of registration wherein flow through said rotary valve is prevented, said valve body member having a locking portion located on one side of said flow passageway of said body member, said locking portion including a closed bottom bore on one side of said body member and an opening in alignment with said closed bottom bore disposed on the opposite side of said body member, said valve member having an end portion extending into said locking portion with said end portion including operating means extending therefrom and terminating exteriorly of said body member, said end portion of said valve member having bore means therethrough movable with said valve member so as to alignable with said opening and said closed bottom bore when said valve is to be locked in the selected position, said bore means including a longitudinal axis and a first bore having a first diameter adjacent one end thereof and a second bore having a second diameter which is greater than said first diameter adjacent the other end thereof, said bore means including seat means intermediate said first and second bores for seating resilient clip means, said clip means having a first end seated in said seat means and a second end having a plurality of resiliently flexible fingers movable between a retracted position away from said longitudinal axis and toward said axis to a locking position, said second end of said clip means being disposed adjacent to said first bore with said first end of said clip means being remote from said first bore, a locking element having a tip having a diameter to permit snug insertion of said tip into said closed bottom bore and said first bore, a neck portion extending from said tip and having a diameter reduced relative to the diameter of said tip and a body extending from said neck and having a diameter greater than that of said neck but less than the diameter of said second bore of said bore means such that when said locking element is fully inserted into said bore means, an annular space is defined between said second bore and said body of said locking element to permit the reception of key means, said tip and said neck having relative lengths such that, when said tip is inserted into said closed bottom bore, said neck will be disposed adjacent to said fingers of said clip means so that retraction of said locking element will be prevented by abutment of said fingers against said tip when said fingers are in said locking position;

said combination including key means, said key means including a hollow cylindrical portion having an internal diameter to permit said body of said locking element to be received therein and an external diameter to permit said hollow cylindrical portion to be inserted into said annular space and engage said fingers of said clip means to move said fingers from said locking position generally radially outwardly completely out of the path of travel of said locking element upon insertion there of in said bore means to said retracted position;

said valve body being made from a material having a selected hardness and said closed bottom bore including a lining member having a hardness substantially greater than said selected hardness;

said key means including a plunger means movably carried by said hollow cylindrical portion for releasably engaging said locking element;

said plunger means including a magnet and said body of said locking element including magnetic material;

said seat means including a frustoconical surface portion and said first end of said clip means including a conical surface portion shaped to complementarily engage said frustoconical surface portion.

* * * * *